United States Patent [19]

Horn et al.

[11] Patent Number: 6,064,741
[45] Date of Patent: May 16, 2000

[54] METHOD FOR THE COMPUTER-AIDED EXCHANGE OF CRYPTOGRAPHIC KEYS BETWEEN A USER COMPUTER UNIT U AND A NETWORK COMPUTER UNIT N

[75] Inventors: Günther Horn; Klaus Müller, both of München; Volker Kessler, Vierkirchen, all of Germany

[73] Assignee: Siemens Aktiengesellschaft, Munich, Germany

[21] Appl. No.: 08/945,157

[22] PCT Filed: Apr. 3, 1996

[86] PCT No.: PCT/DE96/00591

§ 371 Date: Oct. 10, 1997

§ 102(e) Date: Oct. 10, 1997

[87] PCT Pub. No.: WO96/32791

PCT Pub. Date: Oct. 17, 1996

[30] Foreign Application Priority Data

Apr. 13, 1995 [DE] Germany .............................. 195 14 084

[51] Int. Cl.[7] .................................. H04L 9/30; H04L 9/28
[52] U.S. Cl. .............................. 380/285; 380/28; 380/30; 380/283; 713/171
[58] Field of Search ................................... 380/21, 23, 28, 380/30, 283, 285; 713/201, 169, 171

[56] References Cited

U.S. PATENT DOCUMENTS

| | | | |
|---|---|---|---|
| 4,956,863 | 9/1990 | Goss ............................................ | 380/30 |
| 5,809,147 | 9/1998 | De Lange et al. ......................... | 380/28 |
| 5,850,451 | 12/1998 | Sudia ......................................... | 380/49 |
| 5,867,577 | 2/1999 | Patarin ....................................... | 380/23 |
| 5,883,960 | 3/1999 | Maruyama et al. ....................... | 380/23 |

FOREIGN PATENT DOCUMENTS 0 393 806   10/1990   European Pat. Off. .......... H04L 9/32

OTHER PUBLICATIONS

IEE Proceedings—Computers and Digital Techniques, 141 (1994) May, No. 3, Part E, L. Harn, Public–Key Cryptosystem Design Based on Factoring and Discrete Logarithms, pp. 193–195.

IEE (1994), E. Witzke et al, Key Management for Large Scale End–To–End Encryption, pp. 76–79.

IEEE Personal Communications, First Quarter 1994, A. Aziz et al, Privacy and Authentication for Wireless Local Area Networks, pp. 25–31.

P & A JEM Participants, (1993), Joint Experts Meeting on Privacy and Authentication for Personal Communications, Mike Beller, Proposed Authentication and Key Agreement Protocol for PCS, pp. 1–12.

Tsudik, G., "Message Authentication with One–Way Hash Functions," INFOCOM '92 Eleventh Annual Joint Conference of the IEEE Comp. and Com. Soc.s, IEEE, May 1992, v. 3, pp. 2055–2059.

Schneier, B., "Applied Cryptography: Protocols, Algorithms, and Source Code in C," John Wiley & Sons., Oct. 22, 1993, pp. 345, 346, 607.

Primary Examiner—Tod R. Swann
Assistant Examiner—Justin T. Darrow
Attorney, Agent, or Firm—Hill & Simpson

[57] ABSTRACT

The method is for the exchange of cryptographic keys, in which the length of the transmitted messages is significantly reduced and the security properties of the method are considerably increased in comparison with known methods.

In a network computer unit and in a user computer unit, a first interim key and a second interim key are formed as a function of generated random numbers.

A session key is calculated by a bit-by-bit exclusive-OR operation on the first interim key and the second interim key. The keys are never transmitted in plain text. By use of a function, which for example may be a symmetric cryptographic function, a hash function or a one-way function, the network computer unit and the user computer unit authenticate each other.

9 Claims, 4 Drawing Sheets

User computer unit U — Network computer unit N

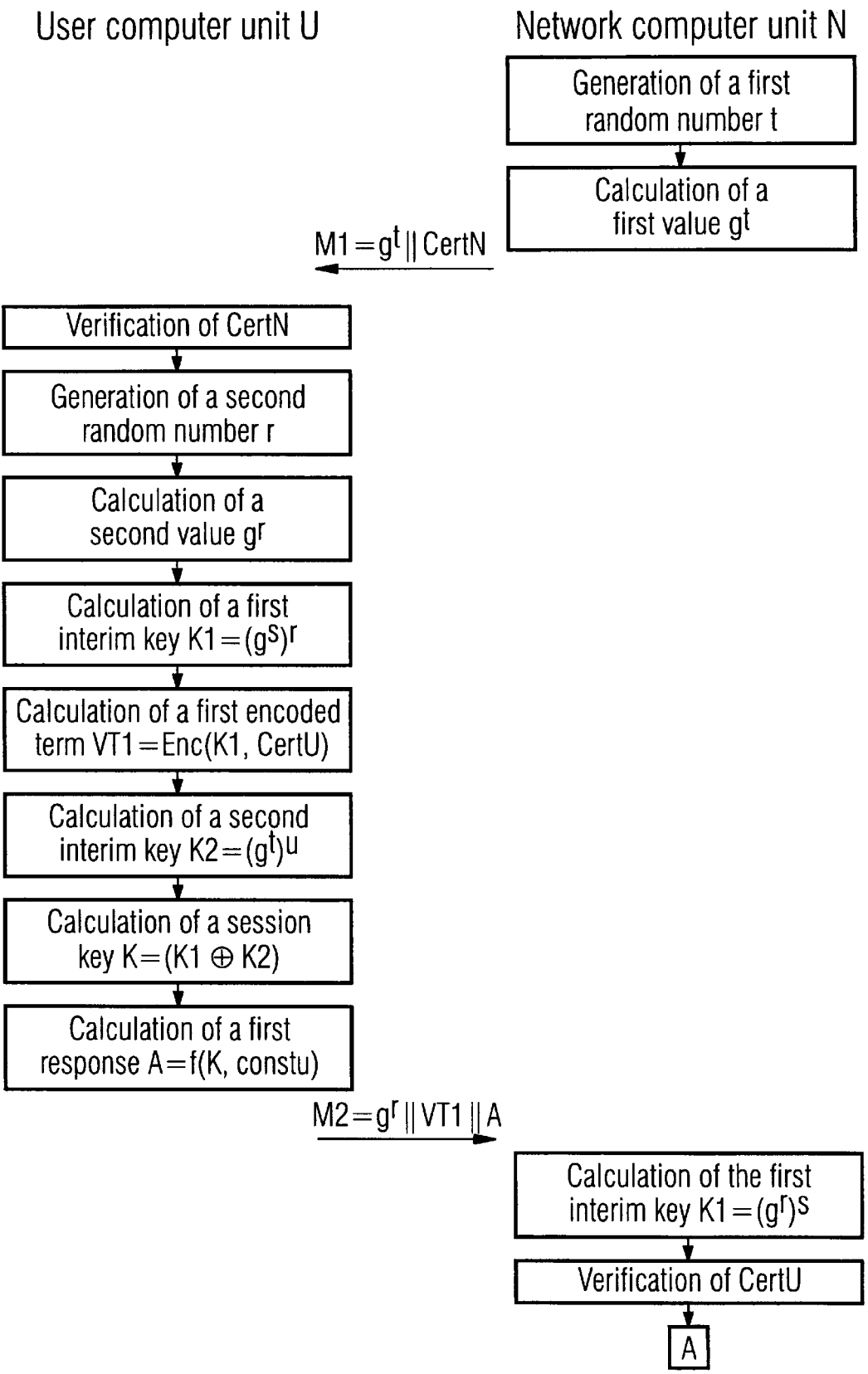

METHOD FOR THE COMPUTER-AIDED EXCHANGE OF CRYPTOGRAPHIC KEYS BETWEEN A USER COMPUTER UNIT U AND A NETWORK COMPUTER UNIT N

BACKGROUND OF THE INVENTION

Information technology systems are subject to various threats. For example, transmitted information may be tapped and altered by an unauthorized third party. A further threat in communication between two communication parties is that of the feigning of a false identity of one communication party.

These and other threats are countered by various security mechanisms which are intended to protect the information-technical system from the threats. A security mechanism used for safeguarding purposes is the encoding of the transmitted data. In order that the data in a communication relationship between two communication parties can be encoded, steps which prepare the encoding first have to be taken before the transmission of the actual data. The steps may comprise, for example, the two communication parties agreeing to a cryptographic algorithm and, if appropriate, agreement being reached on the common secret key.

The security mechanism of encoding takes on particular significance in the case of mobile radio systems, since the transmitted data in these systems can be tapped by any third party without any particular additional effort.

This leads to the requirement for a selection of known security mechanisms to be made and these security mechanisms to be suitably combined, and also for communication protocols to be specified, such that they ensure the security of information-technical systems.

Various asymmetric methods for the computer-aided exchange of cryptographic keys are known. Asymmetric methods which are suitable for mobile radio systems are those described in A. Aziz, W. Diffie, "Privacy and Authentication for Wireless Local Area Networks", IEEE Personal Communications, 1994, pages 25 to 31 and M. Beller, "Proposed Authentication and Key Agreement Protocol for PCS", Joint Experts Meeting on Privacy and Authentication for Personal Communications, P&A JEM 1993, pages 1 to 11.

The method described in A. Aziz, W. Diffie: "Privacy and Authentication in Wireless Local Area Networks", IEE Personal Communications, 1994, pages 25 to 31, relates expressly to local area networks and makes relatively high demands in terms of computing power on the computer units of the communication parties during the key exchange. Moreover, more transmission capacity is required in the method than in the method according to the invention, since the length of the messages is greater than in the case of the method according to the invention.

The method described in M. Beller, "Proposed Authentication and Key Agreement Protocol for PCS", Joint Experts Meeting on Privacy and Authentication for Personal Communications, P&A JEM 1993, pages 1 to 11 does not have integrated in it some fundamental security mechanisms. Explicit authentication of the network by the user is not achieved. Moreover, a key transmitted by the user to the network is not confirmed by the network to the user. There is also no assurance provided that the key for the network is fresh (up-to-date). A further disadvantage of this method is that of the restriction to the Rabin method in the implicit authentication of the key by the user. This restricts the method in terms of a more flexible applicability. In addition, no security mechanism which ensures the incontestability of transmitted data is provided. This is a considerable disadvantage, in particular also in the preparation of incontestable charge accounts for a mobile radio system. The restriction of the method to the signature function used by the National Institute of Standards in Technology as a Digital Signature Standard (NIST DSS) restricts the method in its general applicability.

SUMMARY OF THE INVENTION

The problem of the invention is that of specifying a method for the computer-aided exchange of cryptographic keys which avoids the abovementioned disadvantages.

In general terms the present invention is a method for the computer-aided exchange of cryptographic keys between a user computer unit and a network computer unit. A first random number is used to calculate a first value with the aid of a generating element of a finite group in the network computer unit. A first message which has at least the first value is formed in the network computer unit. The first message is transmitted by the network computer unit to the user computer unit. A second random number is generated in the user computer unit. The second random number is used to form a second value with the aid of the generating element of a finite group in the user computer unit. A first interim key is calculated in the user computer unit by raising a public network key to the power of the second random number. A second interim key is calculated in the user computer unit by the first value being raised to the power of a secret user key. A session key is calculated in the user computer unit by an operation on the first interim key with the second interim key. A second message which as at least the second value is formed in the user computer unit. A second message is transmitted by the user computer unit to the network computer unit. The first interim key is calculated in the network computer unit by the second value being raised to the power of a secret network key. The second interim key is calculated in the network computer unit in that a public user key is raised to the power of the first random number, and the session key is calculated in the network computer unit by the operation on the first interim key with the second interim key.

A first encoded term is calculated in the user computer unit by encoding an identity indication of the user computer unit with the first interim key using a cryptographic function. The second message additionally has at least the first encoded term. The first encoded term is decoded in the network computer unit, and the identity indication of the user computer unit is checked in the network computer unit.

A session key is calculated in the user computer unit by a bit-by-bit exclusive-OR operation on the first interim key with the second interim key, and the session key is calculated in the network computer unit by a bit-by-bit exclusive-OR operation on the first interim key with the second interim key.

A first response is formed in the user computer unit by applying a function to a user constant, and the session key is formed. The second message additionally has at least the first response. The first response is checked in the network computer unit.

A second response is calculated in the network computer unit by applying the function to a network constant, and the session key is formed. A third message is transmitted by the network computer unit to the user computer unit, the third message containing at least the second response. The second response is checked in the user computer unit.

A certification message is transmitted by the user computer unit to the network computer unit at the beginning of the method. The certification message contains at least one identity indication of a certification computer unit which supplies a network certificate which can be verified by the user computer unit.

The first message additionally has a network certificate of the public network key of the network computer unit. The network certificate is verified in the user computer unit. The first encoded term is formed in the user computer unit by encoding a user certificate of a public user key of the user computer unit with the first interim key using a cryptographic function. The user certificate is verified in the network computer unit.

The function represents a symmetric cryptographic algorithm, a hash algorithm or a one-way function. The checking of the first response in the network computer unit consists in that the function is applied to the user constant and to the session key calculated in the network computer unit. The result is checked for matching with the first response. The checking of the second response in the user computer unit consists in that the function is applied to the network constant and to the session key calculated in the user computer unit. The result is checked for matching with the second response.

The function represents a symmetric cryptographic algorithm. The checking of the first response in the network computer unit consists in that the first response is decoded in the network computer unit with the session key calculated in the network computer unit. A decoded user constant is compared with the user constant. The checking of the second response in the user computer unit consists in that the second response is decoded in the user computer unit with the session key calculated in the user computer unit. A decoded network constant is compared with the network constant.

The advantages achieved by the method according to the invention lie in particular in the area of higher security of the method according to the invention in comparison with known methods and in a considerable reduction in the length of the transmitted messages. The following security mechanisms are realized by the method according to the invention:

- mutual explicit authentication by the user and the network, i.e. mutual verification of the claimed identity;
- agreement on the key between the user and the network with mutual implicit authentication, i.e. the method achieves the effect that, after completion of the procedure, a joint secret session key is available, of which each party knows that only the authentic counterpart can likewise be in possession of the secret session key;
- assurance for the user and the network that the session key is fresh (up-to-date),
- mutual confirmation of the session key by the user and the network, i.e. confirmation that the counterpart is actually in possession of the agreed secret session key;
- user anonymity, i.e. confidentiality of the identity of the user with respect to third parties;
- incontestability of data which have been sent by the user to the network on the part of the user;
- sending of a certificate for the network's public key by the network to the user;
- sending of a certificate for the user's public key by the certification authority to the network.

Moreover, a considerable advantage of the method according to the invention is that a modular exponentiation requiring very intensive computing in comparison with a symmetric cryptographic algorithm is to be carried out only twice on each side, which permits a significantly higher protocol processing rate.

The development of the method according to the invention additionally realizes a further security mechanism, the exchange of certificates for public keys between the user and the network.

The method according to the invention can also be adapted very easily to different requirements, since it is not restricted to specific cryptographic algorithms.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIGS. 2a, 2b show a diagram which represents the method of the present invention according to a further embodiment thereof.

DESCRIPTION OF THE PREFERRED EMBODIMENTS.

Figure 1A:
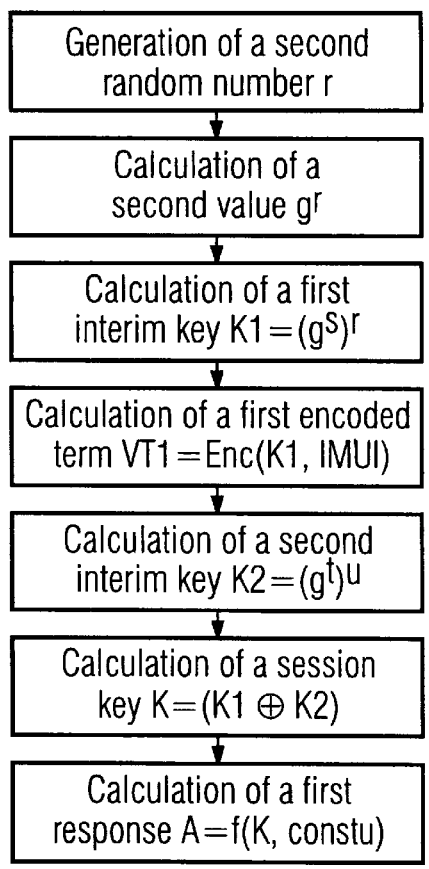
FIGS. 1a, 1b, show a flow chart which represents the method according to the present invention.
Figure 1A:
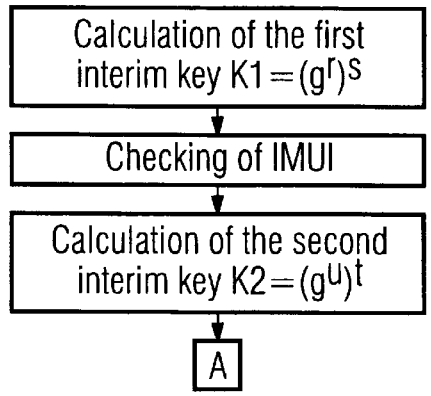
Figure 1B:
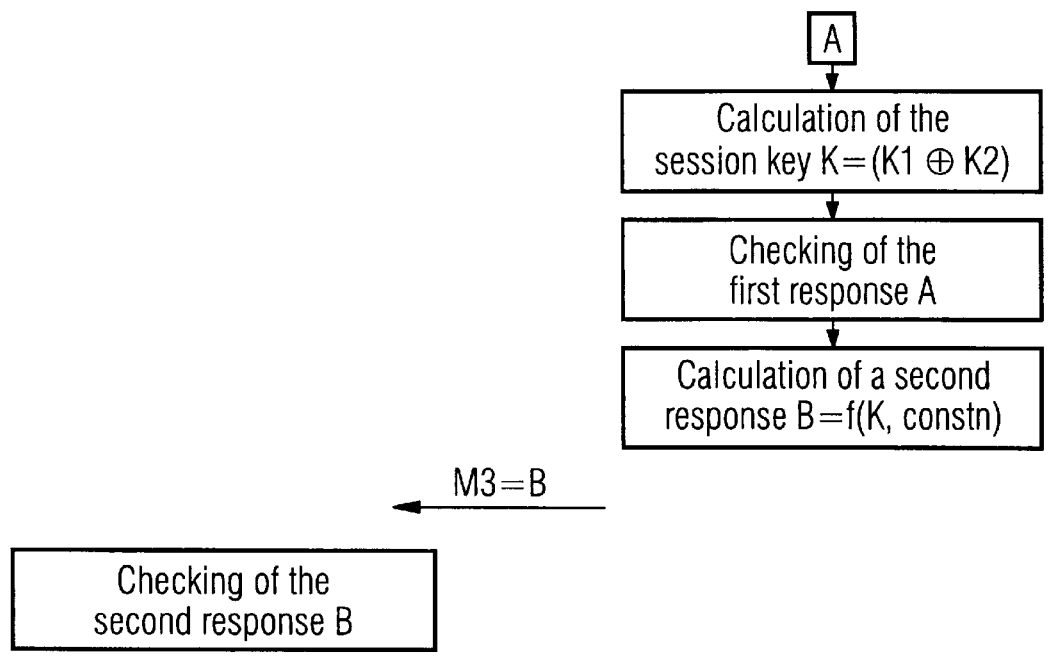

In FIGS. 1a, 1b, the sequence of the method according to the invention is represented by a diagram. In the case of this method, it is presupposed that a trustworthy public network key $g^s$ is available in a user computer unit U. Moreover, it is supposed that a trustworthy public user key $g^u$ is available in a network computer unit N.

The method according to the invention depicted in FIGS. 1a, 1b begins with a generation of a first random number t in the network computer unit N. The first random number t is used to form a first value $g^t$ by a generating element g of a finite group in the network computer unit N.

Asymmetric methods are essentially based on two problems of complexity theory, the problem of efficiently factorizing composite numbers, and the discrete logarithm problem (DLP). The DLP consists in the fact that although exponentiations can be carried out efficiently in suitable computing structures, no efficient algorithms are known for the reversal of this operation, taking the logarithm. Such computing structures are to be understood by the finite groups referred to above. These are, for example, the multiplicative group of a finite field (for example multiplying modulo p, p being a large primary number), or else so-called "elliptic curves". Elliptic curves are of interest in particular because they allow significantly shorter security parameters with the same level of security. This relates to the length of the public keys, the length of the certificates, the length of the messages to be exchanged in the agreement of the session key and also to the length of digital signatures, which are respectively described below. The reason for this is that the methods of taking logarithms known for elliptic curves are significantly less efficient than those for finite fields. A large primary number in this context means that the magnitude of the primary number has to be chosen such that the taking of a logarithm is so complex that it can not be carried out in a reasonable time. Reasonable means in this context a period of time corresponding to the security policy for the information-technical system of several years to decades and longer.

Following the calculation of the first value $g^t$, a first message M1 is formed, which has at least the first value $g^t$.

The first message M1 is encoded in the network computer unit N and transmitted to the user computer unit U. In the user computer unit U, the first message M1 is decoded.

In addition, a second random number r is formed in the user computer unit U. The second random number r is used to form a second value $g^r$ by the generating element g in a way corresponding to the chosen computing structure described above.

A public network key which is available in the user computer unit is raised to the power of the second random number r and consequently forms a first interim key K1.

With the first interim key K1, an identity indication IMUI of the user computer unit U is encoded using a cryptogaphic algorithm Enc. The encoded identity indication IMUI forms a first encoded term VT1.

In addition, a second interim key K2 is calculated in the user computer unit U in that the first value $g^t$ is raised to the power of a secret user key u.

A session key K is calculated by the bit-by-bit application of the exclusive-OR function to the first interim key K1 and the second interim key K2. A first response A is formed by encoding a user constant constu, which is known both to the user computer U and to the network computer unit N, with the session key K using a function f.

The function f may be, for example, a symmetric cryptogaphic function or a hash function or a one-way function. A one-way function is to be understood in this context as meaning a function in which it is not possible to calculate for a given function value a matching input value. A hash function is to be understood as meaning a compressing one-way function, a sequence of input characters of any desired length being mapped on to a sequence of output characters of fixed length in the case of a hash function. Furthermore, collision freedom is required in this context for the one-way function or hash function, i.e. it must not be possible to find two different sequences of input characters which produce the same sequence of output characters. Known hash functions are, for example, the MD2 algorithm or the MD5 algorithm.

Subsequently, a second message M2 is formed in the user computer unit U, the second message M2 containing at least the second value $g^r$, the first encoded term VT1 and the first response A. The second message M2 is encoded in the user computer unit U and transmitted to the network computer unit N.

The second value $g^r$, transmitted in the second message M2, makes it possible for the network computer unit N to form the first interim key K1 itself, without the first interim key K1 having to be transmitted. This is achieved since only the user computer unit U and the network computer unit N are in possession of the first interim key K1.

The first response A serves for verification of the session key, which the network computer unit N can also form, as described below, without the session key K having to be transmitted.

After reception of the second message M2, the second message M2 is decoded in the network computer unit N. Subsequently the first interim key K1 is calculated in the network computer unit N in that the second value $g^r$ is raised to the power of a secret network key s. Consequently, it is possible for the network computer unit N to decode the transmitted first encoded term VT1 with the first interim key K1 calculated in advance.

The decoding of the first encoded term VT1 is carried out and consequently the user computer unit U is authenticated as the sender of the second message M2. By raising a public user key $g''$, which is available in a trustworthy way in the network computer unit N, to the power of the first random number t, the second interim key K2 is formed in the network computer unit N.

The session key K is calculated in the network computer unit N in just the same way as in the user computer unit U by a bit-by-bit exclusive-OR operation on the first interim key K1 with the second interim key K2.

With the aid of the session key K, the first response A is checked using the function f. Depending on what type the function f is, the checking may take place in various ways.

The explicit authentication of the user computer unit (U) is achieved by the first response (A) since, apart from the network computer unit (N), only the user computer unit (U) knows the session key (K).

If the function f is realized by a symmetric cryptographic function, it is possible to carry out the checking of the first response A in two ways:

The user constant constu, known to the network computer unit N can be encoded with the session key K using the function f in the network computer unit N and the result can be compared directly with the first response A. If the result matches the first response A, the correctness of the key K is ensured.

However, it is also possible, to decode the first response A with the session key K calculated in the network computer unit N, and compare a decoded user constant constu' thereby obtained with the known user constant constu. If the user constant constu matches the decoded user constant constu', the correctness of the session key K is likewise ensured.

If the function f is realized by a hash function, the decoding of the first response A is of course not possible. Consequently, in this case it is only possible to set up the checking such that, applying the function f, the user constant constu and the session key K supply a result which is compared with the first response A.

Subsequently, a network constant constn is encoded in the network computer unit N with the checked session key K using the function f and forms a second response B.

In the network computer unit N, a third message M3 is formed, which contains at least the second response B. The third message M3 is encoded in the network computer unit N and is transmitted to the user computer unit U.

In the user computer unit U, the third message M3 is decoded and after that the second response is checked in a corresponding way, as described above for the response A in the network computer unit N.

Figure 2B:
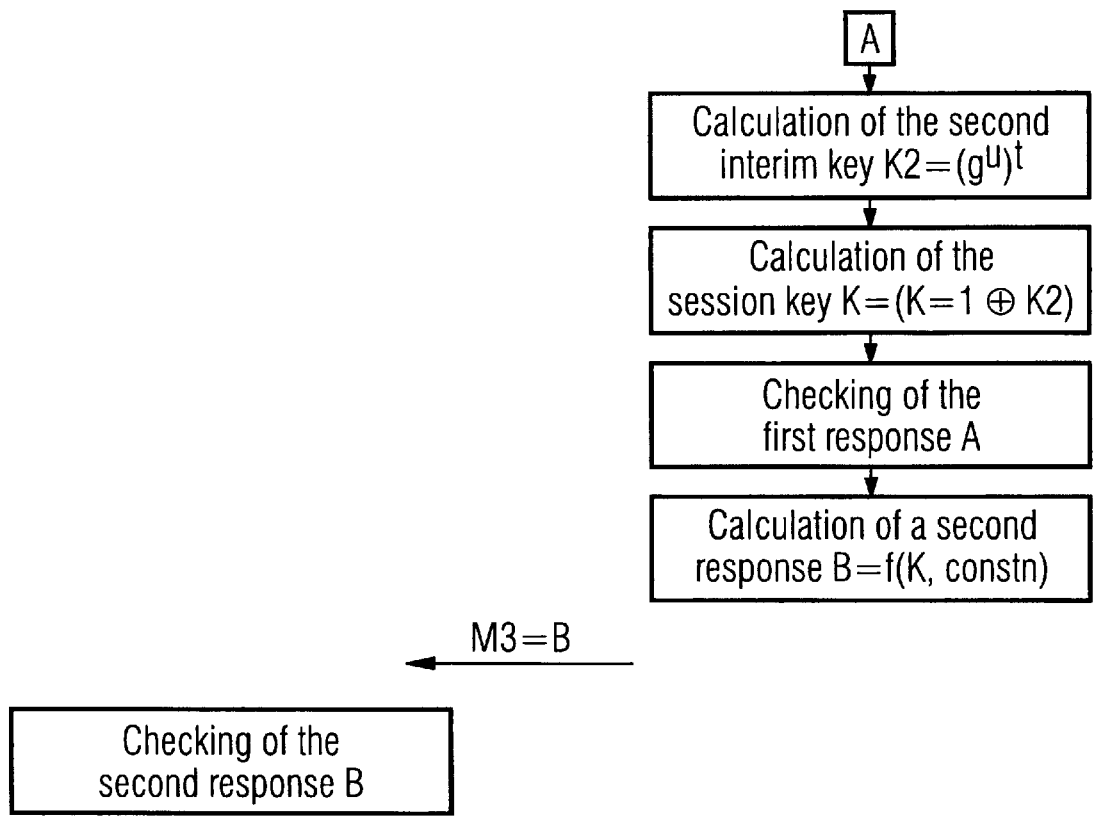

In the event that the public network key $g^s$ is not known or present in a trustworthy way in the user computer unit U or the public user key $g''$ is not known or present in a trustworthy way in the network computer unit N, a development of the method according to the invention is used. This development of the invention is represented in FIGS. 2a, 1b.

If the use of a user certificate CertU and a network certificate CertN are envisaged for the exchange of the public network key $g^s$ and of the public user key $g''$, it may be advantageous if, given the existence of a plurality of trustworthy certification authorities, the user computer unit U informs the network computer unit N by which certification authority the user computer unit U can verify a network certificate CertN.

This may take place, for example, by a certification message being transmitted by the user computer unit U to the network computer unit N at the beginning of the method according to the invention. The certification message has in this context at least one identity indication of a certification computer unit from which the network computer unit N can obtain a network certificate CertN which can be verified by the user computer user unit U.

Once the network computer unit N has obtained the network certificate CertN from the certification computer unit CA, the network certificate CertN is transmitted to the user computer unit U.

This takes place by the network certificate CertN being additionally enclosed with the first message M1. In the user computer unit U, after the decoding of the first message M1, in this case the network certificate CertN is verified and consequently the user computer unit U has obtained a trustworthy public network key $g^{s}$.

In the user computer unit U, in turn a user certificate CertU is determined, and is encoded instead of the identity indication IMUI of the user computer unit U with the first interim key K1, using the cryptographic function Enc, to give the first encoded term VT1. Consequently, the transmission of the user certificate CertU is made possible without the identity of the user computer unit U being disclosed to an unauthorized third party upon the transmission of the second message M2. After decoding of the first term VT1 in the network computer unit N, the user certificate CertU thereby obtained is verified by the network computer unit N. In this way, a trustworthy exchange of network certificate CertN and the user certificate CertU is achieved.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed:

1. A method for computer-aided exchange of cryptographic keys between a user computer unit and a network computer unit comprising the steps of:

generating a first random number;

calculating, using the first random number, a first value with a generating element of a finite group in the network computer unit;

forming a first message, which has at least the first value, in the network computer unit;

transmitting the first message by the network computer unit to the user computer unit;

generating a second random number in the user computer unit;

forming, using the second random number, a second value with a generating element of a finite group in the user computer unit;

calculating a first interim key in the user computer unit by raising a public network key to a power of the second random number;

calculating a first encoded term in the user computer unit by encoding an identity indication of the user computer unit with the first interim key using a cryptographic function;

calculating a second interim key in the user computer unit by the first value being raised to a power of a secret user key;

calculating a session key in the user computer unit by an operation on the first interim key with the second interim key;

forming a second message, which has at least the second value and at least the first encoded term, in the user computer unit;

transmitting a second message by the user computer unit to the network computer unit;

calculating the first interim key in the network computer unit by the second value being raised to a power of a secret network key;

calculating the second interim key in the network computer unit in that a public user key is raised to a power of the first random number;

calculating the session key in the network computer unit by operation on the first interim key with the second interim key;

decoding the first encoded term in the network computer unit; and checking the identity indication of the user computer unit in the network computer unit.

2. The method according to claim 1, wherein session key is calculated in the user computer unit by a bit-by-bit exclusive-OR operation on the first interim key with the second interim key, and wherein the session key is calculated in the network computer unit by a bit-by-bit exclusive-OR operation on the first interim key with the second interim key.

3. The method according to claim 1, wherein a first response is formed in the user computer unit by applying a function to a user constant, and the session key is formed, wherein a second message additionally has at least the first response, and wherein the first response is checked in the network computer unit.

4. The method according to claim 1, wherein a response is calculated in the network computer unit by applying a function to a network constant, and the session key is formed, wherein a third message is transmitted by the network computer unit to the user computer unit, the third message containing at least the response, and wherein the response is checked in the user computer unit.

5. The method according to claim 1, wherein a certification message is transmitted by the user computer unit to the network computer unit at a beginning of the method, the certification message containing at least one identity indication of a certification computer unit which supplies a network certificate which is verifiable by the user computer unit.

6. The method according to claim 1, wherein the first message additionally has a network certificate of the public network key of the network computer unit, wherein the network certificate is verified in the user computer unit, wherein the first encoded term is formed in the user computer unit by encoding a user certificate of a public user key of the user computer unit with the first interim key using a cryptographic function; and wherein the user certificate is verified in the network computer unit.

7. The method according to claim 1, wherein a function is one of a symmetric cryptographic algorithm, a hash algorithm or a one-way function, wherein checking of a first response in the network computer unit comprises applying the function to the user constant and to the session key calculated in the network computer unit, and checking a result thereof for matching with the first response, and wherein checking of a second response in the user computer unit comprises applying the function to a network constant and to the session key calculated in the user computer unit, and checking an result thereof for matching with the second response.

8. The method according to claim 3, wherein the function is a symmetric cryptographic algorithm, wherein checking of a first response in the network computer unit comprises decoding the first response in the network computer unit with the session key calculated in the network computer unit, and comprising a decoded user constant with the user constant, and wherein checking of a second response in the user computer unit comprising decoding the second response in the user computer unit with the session key calculated in the user computer unit, and comparing a decoded network constant with the network constant.

9. The method according to claim 4, wherein a function is a symmetric cryptographic algorithm, wherein checking of a first response in the network computer unit comprises decoding the first response in the network computer unit with the session key calculated in the network computer unit, and comprising a decoded user constant with the user constant, and wherein checking of a second response in the user computer unit comprising decoding the second response in the user computer unit with the session key calculated in the user computer unit, and comparing a decoded network constant with the network constant.

* * * * *